US011668300B2

(12) United States Patent
Høeg

(10) Patent No.: US 11,668,300 B2
(45) Date of Patent: Jun. 6, 2023

(54) SEALING ARRANGEMENT

(71) Applicant: TOCIRCLE INDUSTRIES AS, Oslo (NO)

(72) Inventor: Arne Høeg, Hvalstad (NO)

(73) Assignee: TOCIRCLE INDUSTRIES AS, Oslo (NO)

( * ) Notice: Subject to any disclaimer, the term of this patent is extended or adjusted under 35 U.S.C. 154(b) by 438 days.

(21) Appl. No.: 16/958,700

(22) PCT Filed: Dec. 19, 2018

(86) PCT No.: PCT/NO2018/050320
§ 371 (c)(1),
(2) Date: Jun. 27, 2020

(87) PCT Pub. No.: WO2019/132666
PCT Pub. Date: Jul. 4, 2019

(65) Prior Publication Data
US 2020/0347726 A1 Nov. 5, 2020

(30) Foreign Application Priority Data
Dec. 28, 2017 (NO) .................................. 20172050

(51) Int. Cl.
*F03C 2/00* (2006.01)
*F03C 4/00* (2006.01)
(Continued)

(52) U.S. Cl.
CPC .......... *F04C 15/003* (2013.01); *F01C 19/085* (2013.01); *F04C 2/344* (2013.01);
(Continued)

(58) Field of Classification Search
CPC .. F04C 2/344; F04C 15/0007; F04C 15/0023; F04C 15/003; F04C 18/344;
(Continued)

(56) References Cited

U.S. PATENT DOCUMENTS 3,130,673 A * 4/1964 Finstad ................. F04C 2/3441
418/268
3,740,057 A * 6/1973 Doyle ..................... F16J 15/40
277/927
(Continued)

FOREIGN PATENT DOCUMENTS

| DE | 4221199 A1 * | 2/1993 | ............... F01C 19/10 |
| JP | 57010790 A * | 1/1982 | .......... F01C 21/0881 |
| WO | WO-2012036684 A1 * | 3/2012 | ............... F01D 11/00 |

OTHER PUBLICATIONS

PCT Notification of Transmittal of the International Preliminary Report on Patentability (Oxfort-Thumser, A) dated Apr. 8, 2020.

*Primary Examiner* — Theresa Trieu
(74) *Attorney, Agent, or Firm* — Flener IP & Business Law; Zareefa B. Flener

(57) ABSTRACT

A sealing arrangement between a rotating plane surface on a rotor and a machine housing prevents flow of process fluid between an internal volume and an external volume of the machine housing. The sealing arrangement includes a piston arrangement, and a sealing bearing ring between the piston arrangement and the rotating plane surface. A fluid supply line supplies pressurized lubrication fluid through the machine housing to a piston cavity, wherein the piston arrangement further includes piston fluid channels and the bearing sealing ring includes lubrication conduits through the bearing sealing ring, corresponding with the piston fluid channels. The pressurized lubrication fluid is arranged for moving the piston arrangement against the sealing bearing ring and thus moving the sealing bearing ring against the sealing surface thus forming a sealing arrangement.

12 Claims, 9 Drawing Sheets

(51) Int. Cl.
- *F04C 15/00* (2006.01)
- *F04C 2/00* (2006.01)
- *F01C 19/08* (2006.01)
- *F04C 18/344* (2006.01)
- *F04C 27/00* (2006.01)
- *F16J 15/34* (2006.01)
- *F16J 15/40* (2006.01)
- *F04C 2/344* (2006.01)

(52) U.S. Cl.
CPC ...... *F04C 15/0007* (2013.01); *F04C 15/0023* (2013.01); *F04C 15/0026* (2013.01); *F04C 18/344* (2013.01); *F04C 27/006* (2013.01); *F04C 27/007* (2013.01); *F16J 15/342* (2013.01); *F16J 15/3448* (2013.01); *F16J 15/40* (2013.01); *F04C 2240/54* (2013.01)

(58) Field of Classification Search
CPC .. F04C 27/006; F04C 27/007; F04C 2240/54; F01C 19/085; F16J 15/342; F16J 15/3448; F16J 15/40
See application file for complete search history.

(56) References Cited

U.S. PATENT DOCUMENTS

| | | | |
|---|---|---|---|
| 3,751,045 A * | 8/1973 | Lindeboom | F16J 15/342 277/400 |
| 3,964,844 A * | 6/1976 | Whitmore | F04C 15/0023 418/133 |
| 6,273,694 B1 * | 8/2001 | Vading | F01C 1/352 418/137 |
| 2005/0063855 A1 * | 3/2005 | Niikura | F04C 2/3441 418/268 |
| 2015/0300352 A1 | 10/2015 | Walters et al. | |
| 2019/0360597 A1 * | 11/2019 | Tsumori | F16J 15/40 |

* cited by examiner

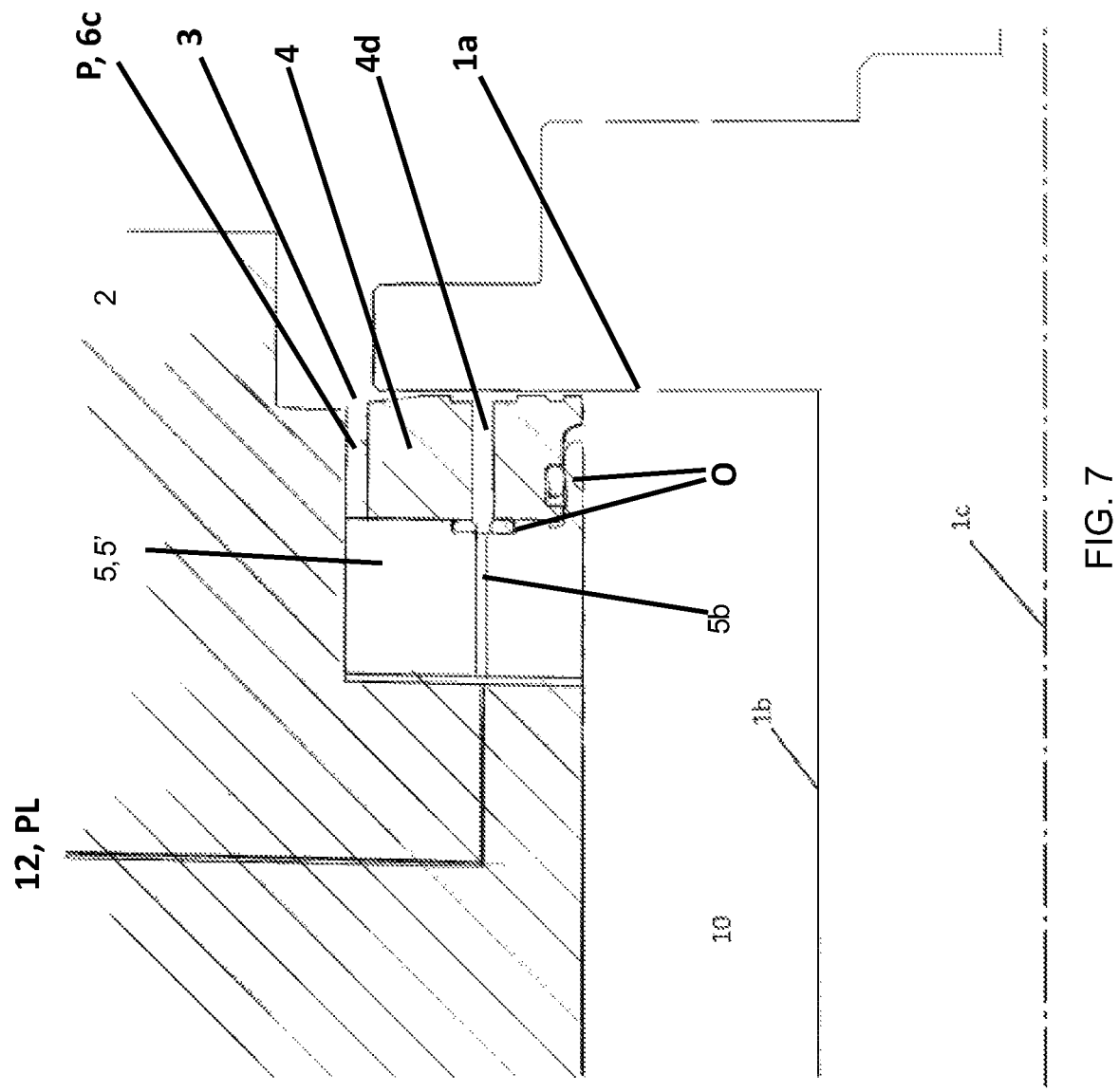

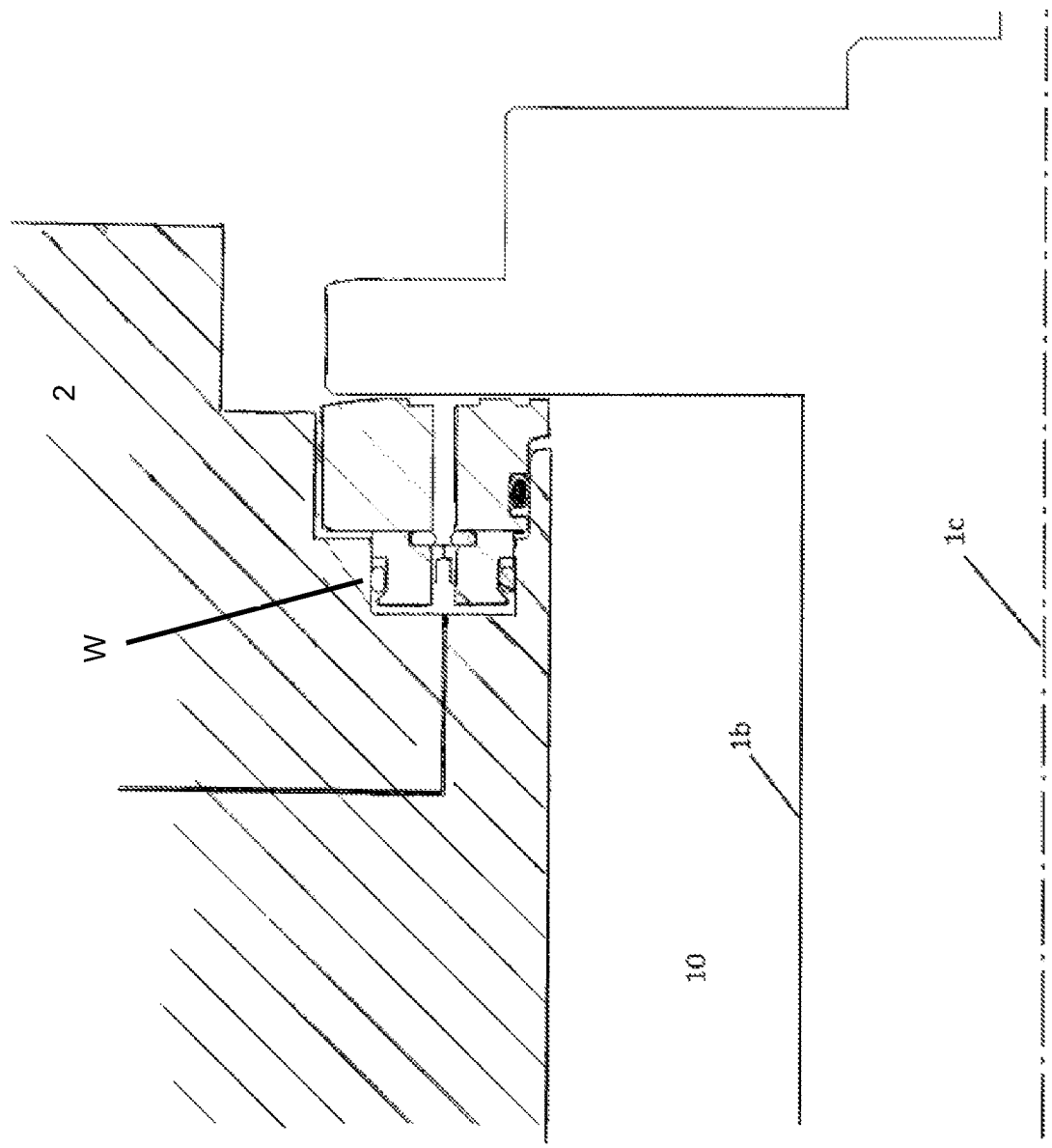

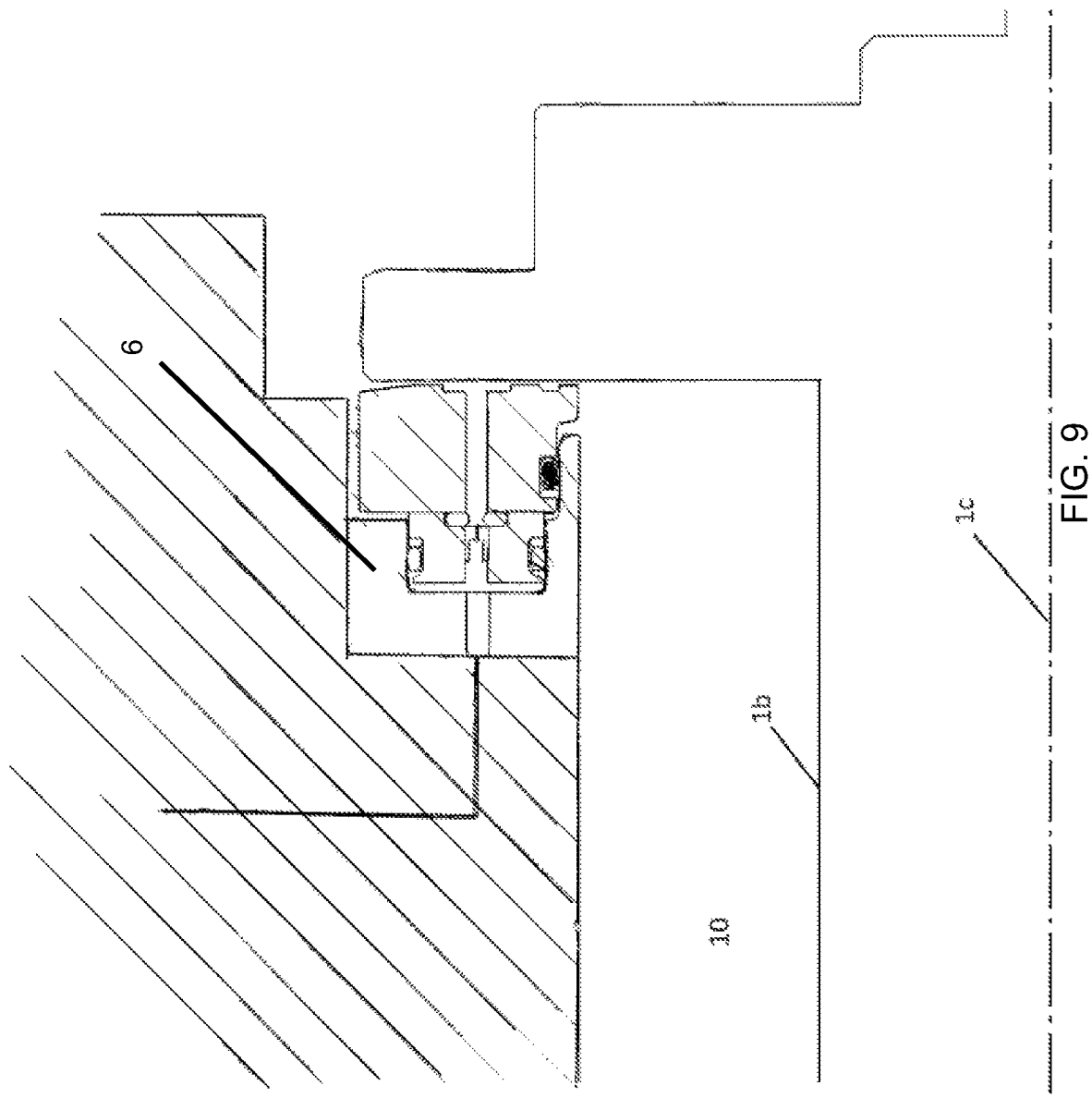

SEALING ARRANGEMENT

FIELD

The present disclosure relates to the technical field of sealing. More specifically it relates to a sealing arrangement for sliding vane machines used as compressors, expanders or pumps.

BACKGROUND ART

Sliding vane machines comprise of a rotor, typically placed eccentrically in a cylindrical housing, with a plurality of vanes that are suspended in the rotor and which follow the inner wall in the cylindrical housing. Sliding vane machines are used for fluid processing and usually comprise a housing with an internal wall forming a cavity with an inlet for supplying process fluid and an outlet for delivering process fluid; a rotor located in the cavity, wherein a distance between an outer face of the rotor and the internal wall of the housing varies in the rotational direction; and vanes slidable in outwardly directed slots in the rotor, for, during the rotation, sliding relative to the rotor to extend between the outer face of the rotor and the internal wall of the housing. Closed or confined spaces are defined between the vanes, the outer face of the rotor and the internal wall of the housing. Since the distance between the outer face of the rotor and the wall varies in the rotational direction, the volumes of the closed or confined spaces also vary in the rotational direction. During operation, these confined spaces are filled with process fluid, and the variation of their volumes causes a varying flow of process fluid around the rotor. The location and shape of the inlet and outlet are adapted to provide a flow of process fluid from the inlet to the outlet.

The variable distance between the outer face of the rotor and the internal wall of the housing can be achieved by both the cavity and the rotor being cylindrical, and the rotor being eccentrically mounted in the cavity. Alternatively, the cavity may have other shapes, e.g. oval. The ends of the cavity are closed by end caps attached to the housing. The rotor and the vanes extend throughout the cavity in an axial-parallel direction.

The rotor may be driven by an external driver. The rotor then drives the vanes, and the vanes move the process fluid. In this case, the rotary vane machine works as a pump if the process fluid is a liquid, and as a compressor if the process fluid is a gas or 2-phase fluid, i.e. a mixture of liquid and gas. In other uses, the process fluid may drive the vanes and thereby the rotor, which can do external work. In this case, the rotary vane machine works as a hydro-motor if the process fluid is a liquid, and as an expander if the process fluid is a gas or 2-phase fluid.

For all rotary sliding vane machines, the pressure varies from the inlet to the outlet. Consequently, there are varying differential pressures across the vanes, which causes varying tangential forces acting on the vanes. Normally, there is also a change of direction of the tangential forces during the rotation.

The plane surfaces in the end of the chamber will, if they are part of the rotor, rotate in relationship to the housing, and if they are part of the housing, the rotor will rotate with respect to the surfaces. The interface between these two components needs to be sealed against leakage of process fluid. Depending on the requirements for the actual use of the rotary sliding vane machine, sealings may be provided both at the outer edges of the vanes, at the sides of the vanes and at the sides of the rotor. There exist several different types of solutions for plane seals, with rotation and pressure on one side. For example, water lubricated sealing rings are used on plane shaft seals in conjunction with water turbines. There also exist plane seals that are based on labyrinth seals in graphite, which rotate and are in contact with polished steel sealing surfaces with or without water lubrication.

Prior art solutions using a hydrostatic lubricant film as a barrier against leakage may have almost zero leakage rate, but require a steady flow of lubricant to both sides of the seal, to avoid a temperature rise. In order for the seal to function properly, the hydraulic pressure between the seal and the sealing surface must be higher than the pressure in the process fluid which is to be sealed from leaking. Otherwise, the process fluid might press the lubricant out of the gap between the seal and the sealing surface, resulting in undesired consequences such as leakage and/or dry running of the seal. The gap between the seal and the sealing surface in a hydrostatic seal is typically smaller than normal machining tolerances and movement between the parts during operation, so that the seal needs to be pressed towards the sealing surface by a given force. This force needs to be equal to the desired film pressure times the effective bearing area of the seal. Even though hydrostatic bearings and seals are characterized by low friction, the force needed to seal a large seal with a large effective area, can lead to friction which may be a significant proportion of the mechanical power of the machine. If a seal with a 250 mm radius with an effective area of 30 000 $mm^2$ is to seal against a process pressure of 2 MPa, the force on the seal needs to be larger than 60 kN. Even with a very low coefficient of friction of 0.005, this seal would result in a friction force of 300 N. If the relative velocity of the seal is 30 m/s, this kind of friction would result in a power consumption of 9 kW per seal. A seal friction of this order may be insignificant in a large hydro turbine, but may be significant in smaller-scale device, such as a compressor or an expander.

Prior art solutions of the labyrinth type will typically have low friction, but the leakage rate will be highly dependent on the width of the gap between the parts to be sealed. In large rotary vane machines, the surfaces may move due to pressure distribution, thermal expansion and deformation due to the normal loading of the machine. A labyrinth type seal against gaseous media, like high-pressure steam or air, needs a very tight gap in order to seal satisfactory.

Prior art solutions depending on mechanical seals, tend to have high friction and high wear rate at process pressures in excess of 0.5 MPa and relative speeds in excess of 10 m/s.

Another prior art solution is diagonally braided fibre gaskets, typically made from graphite and/or other fibres, positioned in grooves and pressed against a sealing surface. One example of this type is the gasket Buraflex HT 2000 from Eagle Burgmann. This type of seal is recommended for conditions typically present in steam expanders, and relatively high velocities in the region of 30 m/s. However, this type of seal is sensitive to pressure fluctuations and changes in seal gap, and it is difficult to obtain low leakage rates and low friction simultaneously. Testing this type of seal in a steam compressor has revealed that the service life of such a seal is unpredictable.

Further, prior art solutions are typically designed for symmetric load around the symmetry axis, that is a uniform fluid pressure around the perimeter of the seal. If the fluid pressure in the machine varies with the angular position and time, for example in a rotary vane compressor or expander, the resulting force from the pressure on a seal will have a resultant force in the radial direction, which will result in a load on the components of the seal. Available prior art solutions do not target the issue of radial forces.

It is hereby proposed a solution to the sealing problem of rotary vane machines that provides a labyrinth type seal function, controlled by hydrostatic bearing pads, and that also provides solutions to the problems of unevenly distributed radial pressure forces and friction.

In addition, when studying sealing solutions belonging to the prior art, the main disadvantage of the commercially available seals that has been identified is that these seals are not developed for the mentioned conditions in rotary vane machines.

Many of the prior art sealing solutions depend on initial wear-in, wherein material deposits from the seal onto the sealing surface, improve the sealing performance and reduce the wear rate. In applications where the sealing surface has an eccentric motion relative to the seal, this wear-in, and subsequent reduction in wear rate, does not occur, or it occurs to a lesser extent.

SUMMARY

The present disclosure aims to disclose a sealing arrangement that solves the problems of the prior art sealing arrangements.

The disclosure is a method of sealing and a sealing arrangement for a sliding vane machine for compressing or expanding a fluid, for sealing between a rotating plane surface on a rotor and a machine housing to prevent flow of process fluid between an internal volume to an external volume of said vane machine comprising:

said housing comprising a seal pocket located at a housing end and said seal pocket opens towards the direction of the external volume and the internal volume,
an assembly arranged for mounting in said seal pocket, said assembly comprising:
a piston arrangement,
a sealing bearing ring between said piston arrangement and said plane surface,
a fluid supply line for a pressurized lubrication fluid through said housing to a piston cavity, said piston arrangement further having piston fluid channels and said bearing sealing ring having lubrication conduits through said bearing seal ring, corresponding with said piston fluid channels,
said pressurized lubrication fluid arranged for moving said piston towards and against said sealing bearing ring and thus moving said sealing bearing ring towards and against said sealing surface thus forming a sealing arrangement, wherein flow restriction of said piston fluid channels at least in part is provided by flow restrictors.

The disadvantages associated with prior art solutions are mitigated by establishing a sealing gap with tightly controlled gap distance, regardless of eccentricity and even axial movement of the sealing surface. The solution has a predictable leakage rate, reduced friction, and reduced wear of the seal or the sealing surface.

FIGURE CAPTIONS

The attached drawing figures illustrate some embodiments of the claimed machine.

FIG. 7 is a cross-sectional view of yet another embodiment of the sealing unit.

FIG. 8 is a further embodiment of the sealing unit.

FIG. 9 is yet another embodiment of the sealing unit.

DETAILED DESCRIPTION OF THE FIGURES AND EMBODIMENTS

Figure 1:
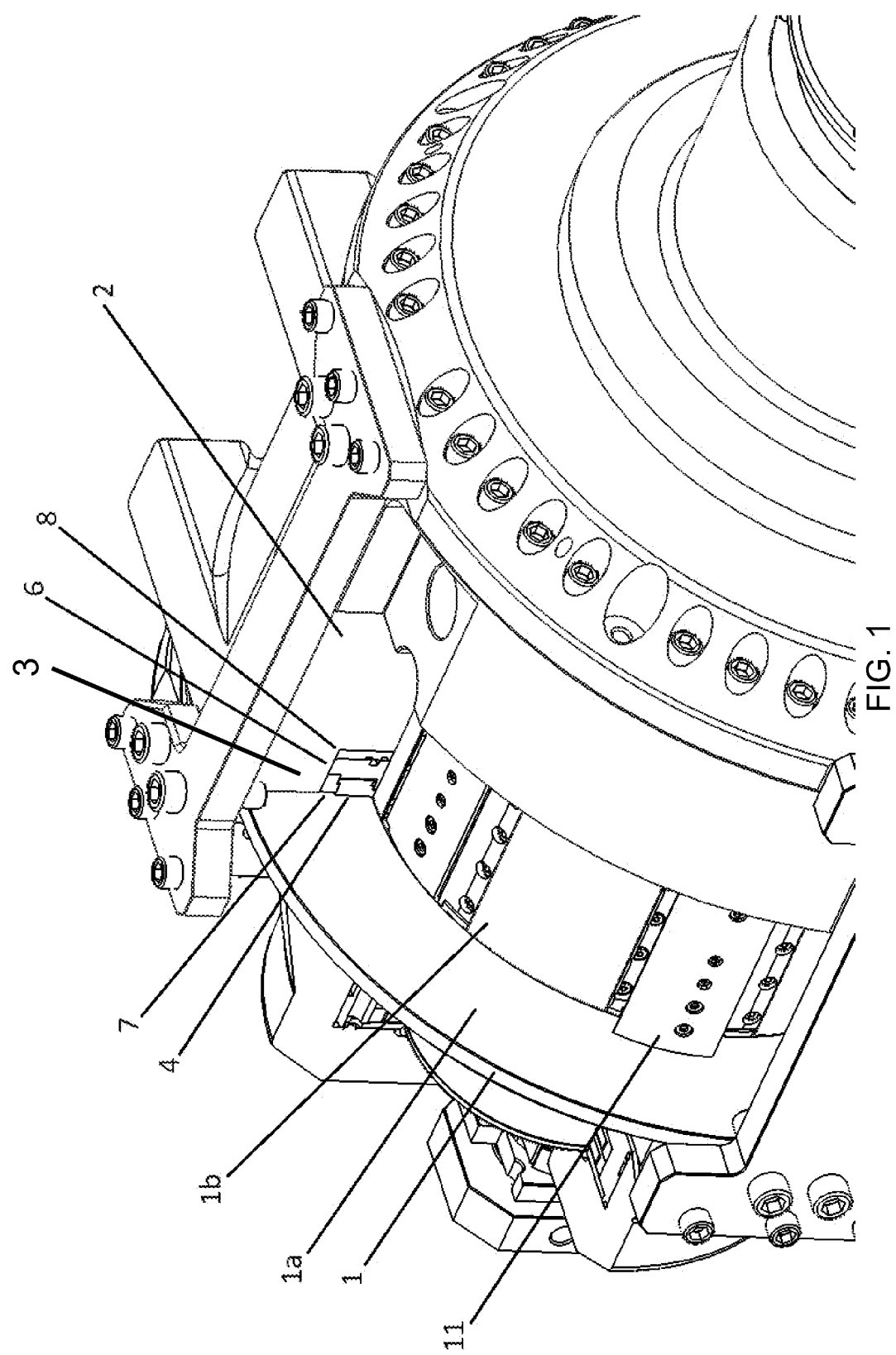
FIG. 1 illustrates a partially sectioned perspective view of a rotary vane compressor wherein one visible sealing unit is shown.

In the following, embodiments will be explained with reference to the accompanying drawings.

It is disclosed a sealing arrangement for a sliding vane machine for compressing or expanding a fluid, for sealing between a rotating plane surface (1a) on a rotor (1) and a machine housing (2) to prevent flow of process fluid (F) between an internal volume (10) to an external volume (13) of said vane machine comprising:

said housing (2) comprising a seal pocket (P) located at a housing end (20), said seal pocket (P) having an aperture towards the direction of said external volume (13) and said internal volume (10),
a sealing assembly (3) arranged for mounting in said seal pocket (P), said sealing assembly (3) comprising:
a piston arrangement (5, 5'), and
a sealing bearing ring (4) between said piston arrangement (5, 5') and said plane surface (1a),
a fluid supply line (12) for a pressurized lubrication fluid (LF) through said housing (2) to a piston cavity (6c), said piston arrangement (5, 5') further having piston fluid channels (5b) and said sealing bearing ring (4) having lubrication conduits (4d) through said bearing seal ring (4), corresponding with said piston fluid channels (5b),
said pressurized lubrication fluid (LF) arranged for moving said piston (5, 5') against said sealing bearing ring (4) and thus moving/forcing said sealing bearing ring (4) towards and against said sealing surface (1a) thus forming a sealing arrangement. Flow restriction of the piston fluid channels (5b) is at least in part provided by flow restrictors (5a).

The sealing assembly (3) is depicted in a cross-sectional view in FIG. 7. The embodiment shows a piston arrangement (5, 5') placed in a pocket (P) that is a recess in the housing (2). This recess or pocket (P) can be manufactured by turning or machining a recess in the housing (2). The pressurized lubrication fluid flows through a conduit (12) via a pump (not shown) to the piston arrangements (5,5') cavity (6c). The piston arrangement (5, 5') acts against the sealing bearing ring (4) which in turn acts against the plane surface (1b). At the same time, the pressurized lubrication fluid (LF) will flow through the piston fluid channels (5b). These piston fluid channels (5b) are in fluid connection with the lubrication conduits (4d) of the bearing sealing ring (4). For sealing of the pressurized fluid, O-rings (0) or equivalent can be used around the piston arrangement (5, 5'), between the piston arrangement (5, 5') and bearing sealing ring (4) and radially between the piston arrangement (5, 5') and bearing sealing ring (4).

The disclosure mitigates the disadvantages associated with prior art solutions, by establishing a sealing gap with tightly controlled gap distance, regardless of eccentric and even axial movement of the sealing surface, that has a predictable leakage rate, no friction, and no wear of the seal or the sealing surface. It is provided a balanced seal, wherein the local process fluid exerts pressure on both the effective area of a sealing lip and on a similar pressure area in connection with the process chamber, so that the seal is unaffected by uneven pressure distribution and varying local pressure. It is also provided a sealing solution with low friction, as the gap distance is controlled by hydrostatic bearings that only need a small preloading to maintain a predictable lubrication film. As the load on the seal from the process fluid pressure is nearly or for the most part balanced, the necessary loading of the bearings is low, and the resulting friction is also low.

In an embodiment, the piston arrangement (5, 5') is accommodated in one or more corresponding piston cavities (6c), wherein the piston cavity (6c) is arranged in an inner portion of the pocket (P).

In another embodiment, the piston cavities (6c) are arranged in a wall (W) in the pocket (P) in the housing (2). This wall (W) is depicted in FIG. 8. This is beneficial due to an improved sealing of the piston arrangement (5, 5'). Sealing of a pressurized fluid is a lot easier to accommodate in a discrete cavity in a wall. O-rings or similar may be used for this purpose.

Figure 3:
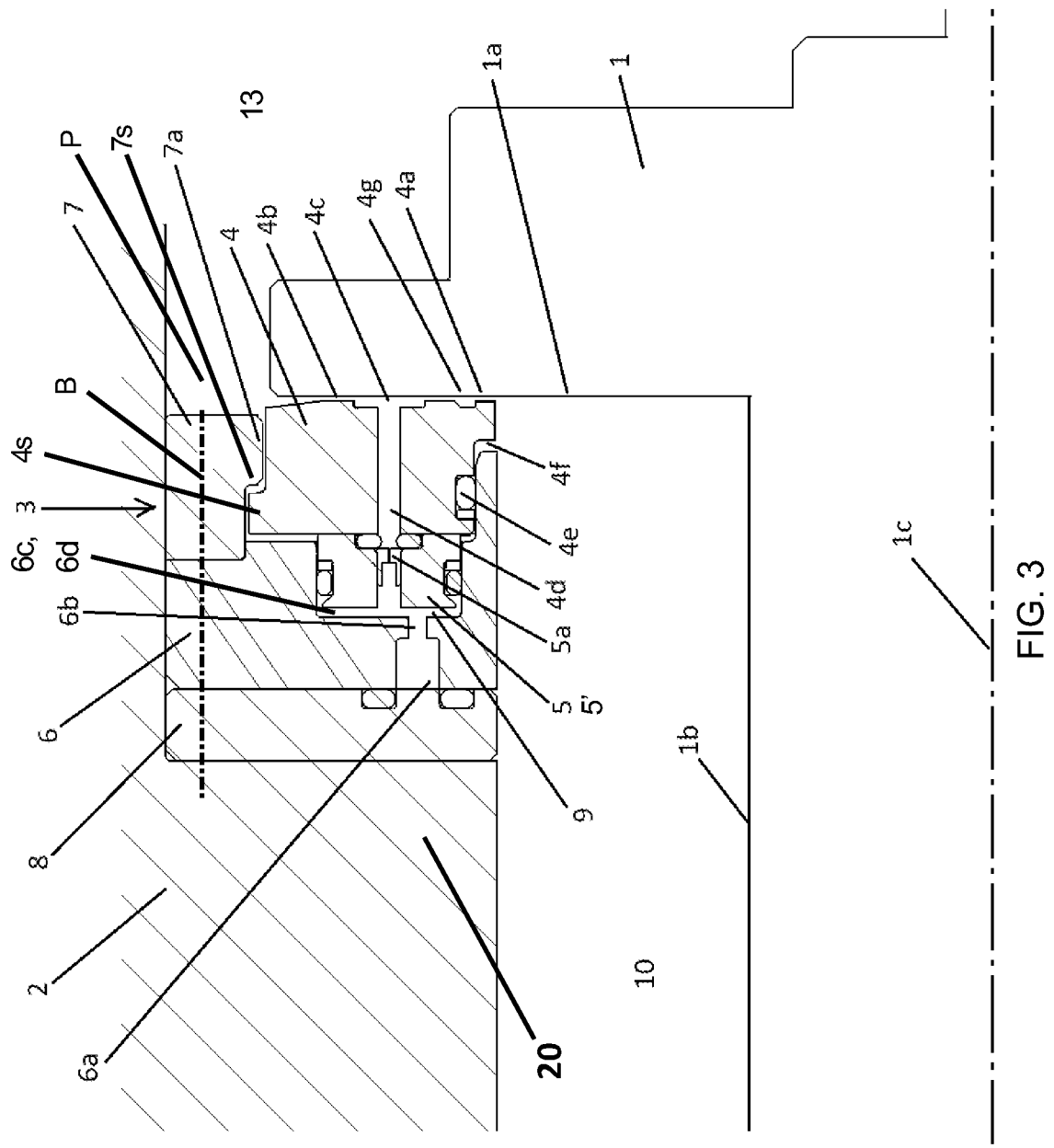
FIG. 3 is a detailed cross-sectional view of the sealing unit.
Figure 6:
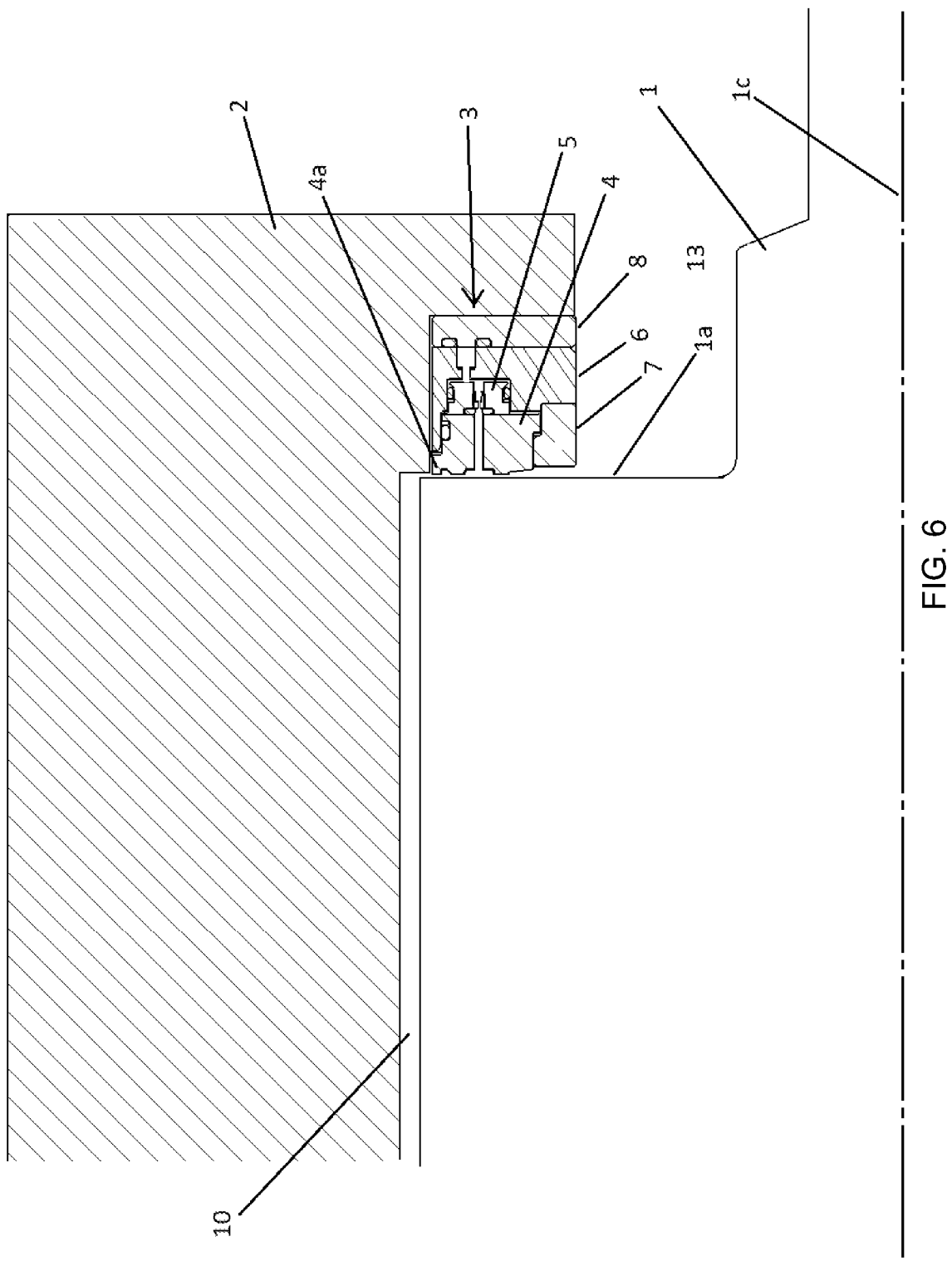
FIG. 6 shows a detailed cross-sectional view of another embodiment of the sealing unit.

According to an embodiment, a piston housing ring (6) is arranged between the sealing bearing ring (4) and the housing (2) and accommodates one or more piston cavities (6d) for the piston arrangement (5, 5'), the piston housing ring (6) further comprises channels (6a) through one or more piston cavities (6d). FIGS. 3, 6 and 9 all show a piston housing ring (6) arranged in such a manner. By utilizing a separate piston housing ring (6) between the housing (2) and the sealing bearing ring (4), it is easier to obtain the required machining tolerances and final fitting tolerances within the seal assembly. The pocket (P) is a simple machined recess.

FIG. 1 shows a partially sectioned rotary vane compressor. A rotor (1) is eccentrically mounted in a housing (2) so that a cavity is formed between the inner surface of the housing, a surface (1b) of the rotor and two sealing surfaces (1a) (only one surface is shown). A number of vanes (11) are slidably mounted in the rotor (1), so that the vanes (11) follow the inner surface of the housing (2). The cavity is divided into compression chambers, and the volume of said chambers vary as the rotor (1) is rotated. A change in volume leads to a change in pressure of the medium inside the chambers. A sealing assembly (3) is shown, mounted in the housing (2), comprising of a seal ring (4), a piston housing (6), a retaining and guide ring (7) and a water distribution ring (8).

Figure 2:
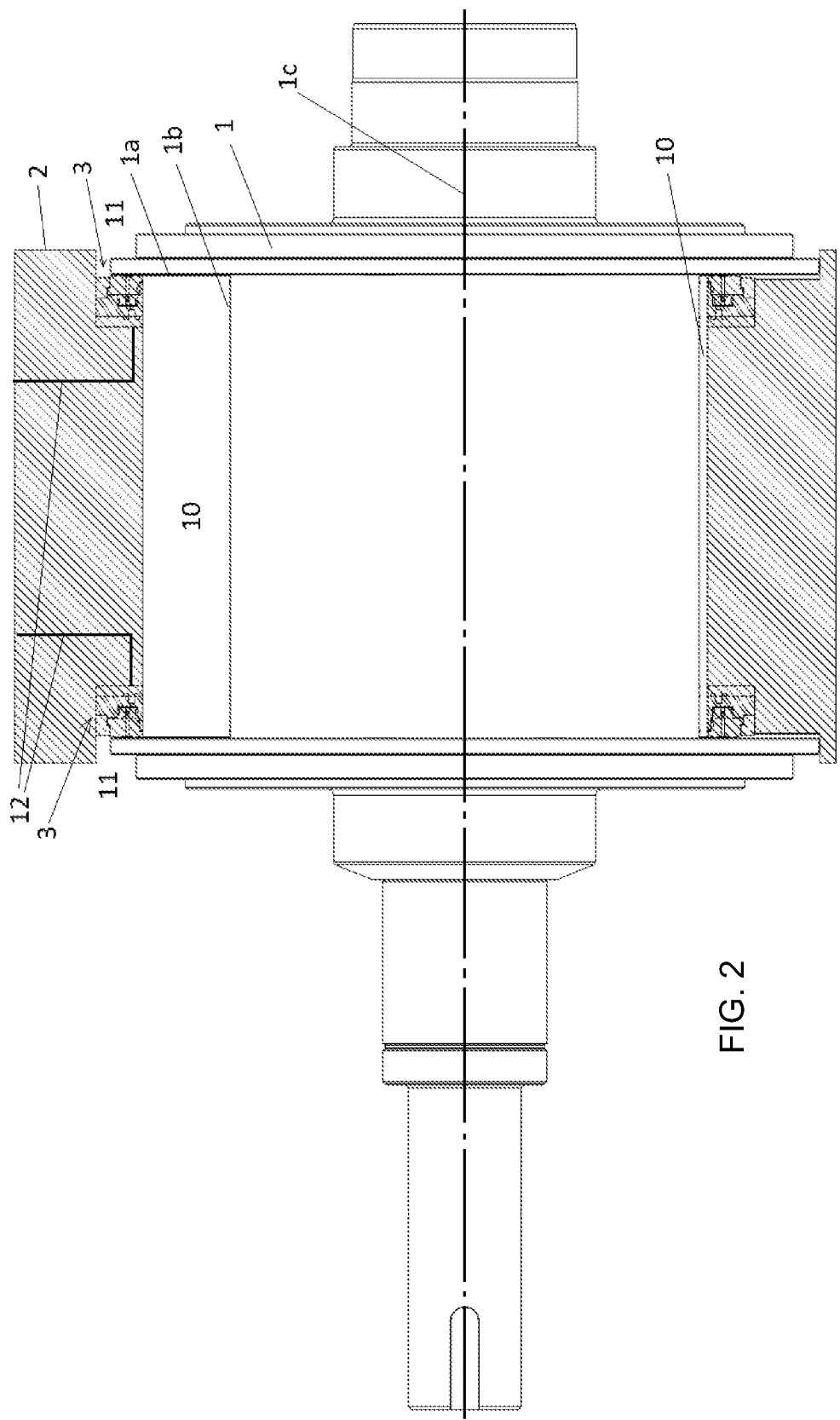
FIG. 2 is a cross-sectional view axially through of a rotor which is eccentrically arranged in a housing with two sealing units.

FIG. 2 illustrates an embodiment wherein the sealing assembly comprises more components, and shows a cross section through the rotor (1) inside the housing (2), and two sealing assemblies (3). The figure shows the eccentric rotor axis (1c) relative to the housing (2), that makes the distance between the inner surface of the housing (2), and the surface (1b) of the rotor (1), vary with the position (angular rotation). The figure also shows how the sealing surfaces (1a) of the rotor (1) have an eccentric movement relative to the sealing arrangements. Lubrication for the sealing arrangements is provided through the housing (2) to the seal arrangements through a supply line (12) in the housing. The distribution of the lubrication through the supply line (12) may be constituted as holes, channels, hoses or similar.

Supply of lubrication may be via a pump 14 (not shown) that is connected to the supply line (12). This auxiliary pump may be mounted on the housing itself or located in an easily accessible location.

FIG. 3 is a detailed view of the cross section through the sealing arrangement (3), showing the sealing assembly (3) placed in the housing (2), and a sealing bearing ring (4) facing towards the plane, rotating, sealing surface (1a) of the rotor (1). The sealing assembly (3) prevents flow of process fluid between an internal volume (10) to an outside volume (13). The sealing assembly (3) comprises a sealing bearing ring (4) that is located between a piston housing (6) and a retaining and guide ring (7). The sealing bearing ring (4) is pressed towards and against the sealing surface (1a) of the rotor (1) by a plurality of pistons 5', inserted in the piston housing (6). An optional fluid/water distribution ring (8) is shown between the housing (2) and the piston housing (6). The function of said distribution ring (8) may, in an embodiment, be integrated in or form part of the housing (2). Still with reference to FIG. 3, in an embodiment, the features and functions of the piston housing (6) can also be integrated in or form part of the housing (2). Lubricant is supplied to the sealing assembly (3) from the water distribution ring (8), through a channel (6a) in the piston housing (6), via apertures/holes (6b) to one or more cylinder volumes (9). From the cylinder volumes (9), the lubricant flows through restrictors (5a) in the pistons 5' and channels (4d) to hydrostatic bearing surfaces (4b). Optional recesses (4c) in the bearing surfaces increase the effective area of the bearing surfaces. When lubricant is provided at a supply pressure higher than the pressure of the outside volume (13), the supply pressure will act on the pistons 5' and exert a force on the pistons 5'. As the flow of the lubricant is restricted by the restrictors (5a), the lubricant pressure between the bearing surface (4b) and the sealing surface (1a) will be lower than the supply pressure, which requires that the effective area of bearing surface (4b) is greater than the area of piston 5' exposed to supply pressure. The distance between the bearing surface (4b) and the sealing surface (1a) will determine the rate of the flow from the recess (4c) to the outside volume (13), and the flow rate will determine the pressure difference across the restrictor (5a). When the distance is small (for example 4 μm) the pressure difference will be low, and the pressure between the bearing surfaces (4b) and the sealing surface (1a) will be high. The sealing assembly (3) thereby acts as a hydrostatic bearing, which are then self-adjusting, and will maintain a more or less constant distance between the bearings (4b) and the sealing surface (1a), typically 4 to 20 μm, with water as a lubricant. The sealing bearing ring (4) has a seal lip (4a), that will be kept at a constant distance from the sealing surface (1a), wherein said distance may be the same as the distance between the bearing surfaces and the sealing surface. The small distance between the seal lip and the sealing surface, will result in a small but predictable leakage from the internal volume (10) to outside volume (13). The sealing bearing ring (4) can move in the axial direction, limited by the retaining and guide ring (7), and to a smaller degree in the radial direction, limited by a sliding surface (7a) of the retaining and guide ring (7). An O-ring placed in a groove (4e) as part of the seal ring (4), prevents leakage between the sealing bearing ring (4) and the piston housing (6), from the internal volume (10) to volume (11). A small area (4f) is provided between the seal ring and the piston housing, wherein the pressure of the internal volume (10) acts on the area (4f) to press the seal ring towards and against the sealing surface. The pressure distribution between the seal lip (4a) and the sealing surface will act on the area (4a) to press the seal ring away from the sealing surface. The areas (4a) and (4f) may be chosen to balance the pressure forces from the medium in the internal volume (10), so that the load on the bearing surfaces is mainly dependent on the supply pressure and the piston area. The contact surface (7a) between the sealing bearing ring (4) and the guide ring (7), may be designed so that the contact area is centrically placed relative to the pressure area between the groove (4e) and the sealing surface. The function of the restrictor (5a) may in an embodiment be obtained by distinct restrictors in the channel (4d), a reduced flow cross section in the pistons 5' or the seal ring (4), or even by the geometry of the recess (4c).

Figure 4:
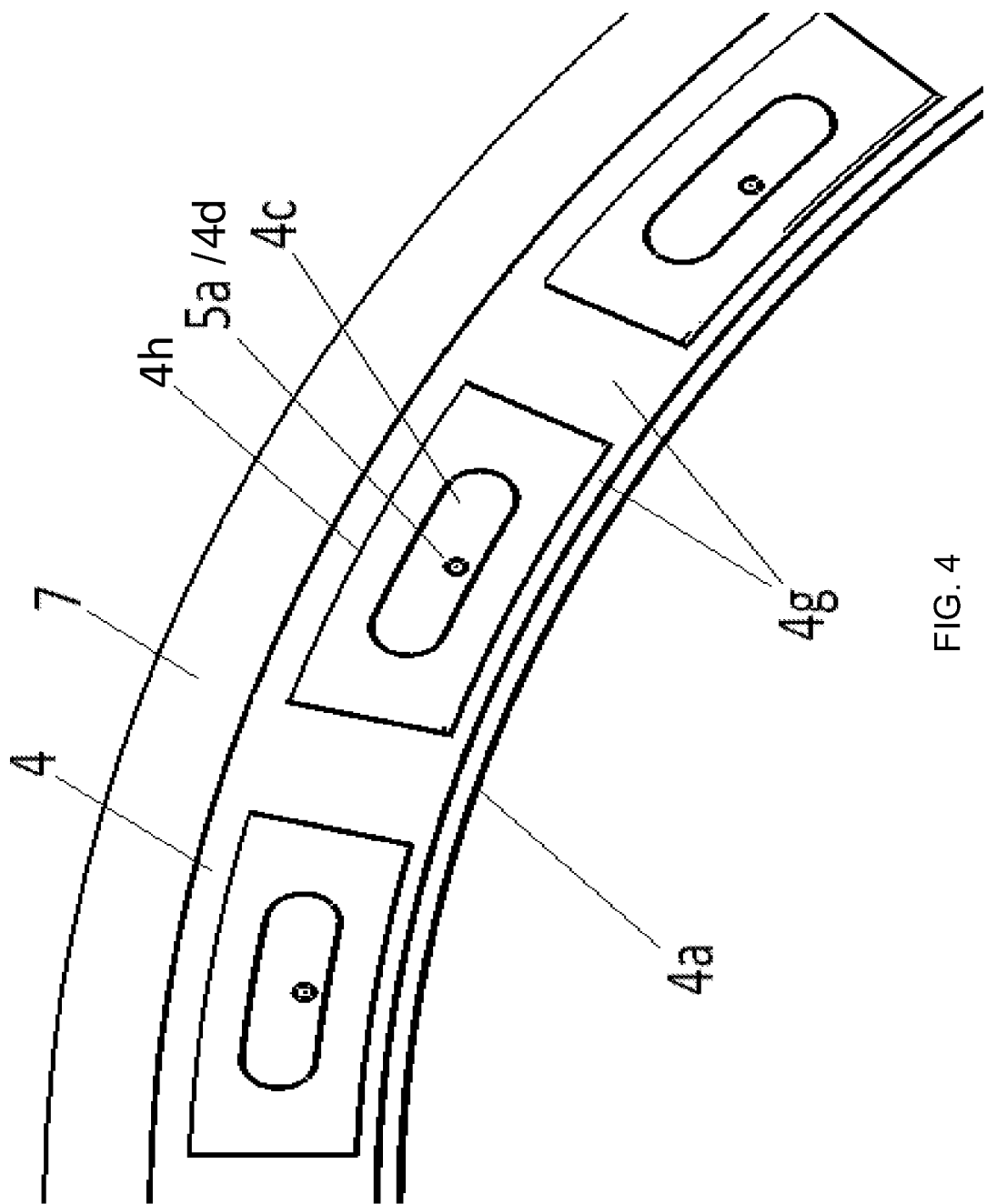
FIG. 4 is a plan view of part of the sealing surface.

FIG. 4 is a view of a portion of the seal ring (4), seen from the outer volume. The bearings provide a substantially non-variable, small distance between the sealing lip/rim and a (rotating) plane sealing surface of a rotor. The hydrostatic bearings are self-adjusting and self-balancing and will follow the sealing surface when the sealing surface is non-planar or experience throw-out, i.e. an imbalance or a warpage, due to surpassed production tolerances and/or thermal expansion. The sealing can even tolerate small axial movements of the sealing surface. The figure shows a sealing lip (4a), a number of hydrostatic bearing pads 4h with optional recesses (4c) and channels (4d) with restrictors (5a). The bearing pads may be designed in a number of different ways. Drain grooves (4g) separate the bearing pads and the sealing lip from the bearing pads 4h. The drain grooves (4g) ensure that lubricant may exit the bearing pads 4h, and process fluid leaking across the sealing lip, are drained to the external volume, with only a negligible pressure build-up outside the sealing lip or rim. The figure also shows that the sealing lip/rim is the only sealing feature of the surface.

Figure 5:
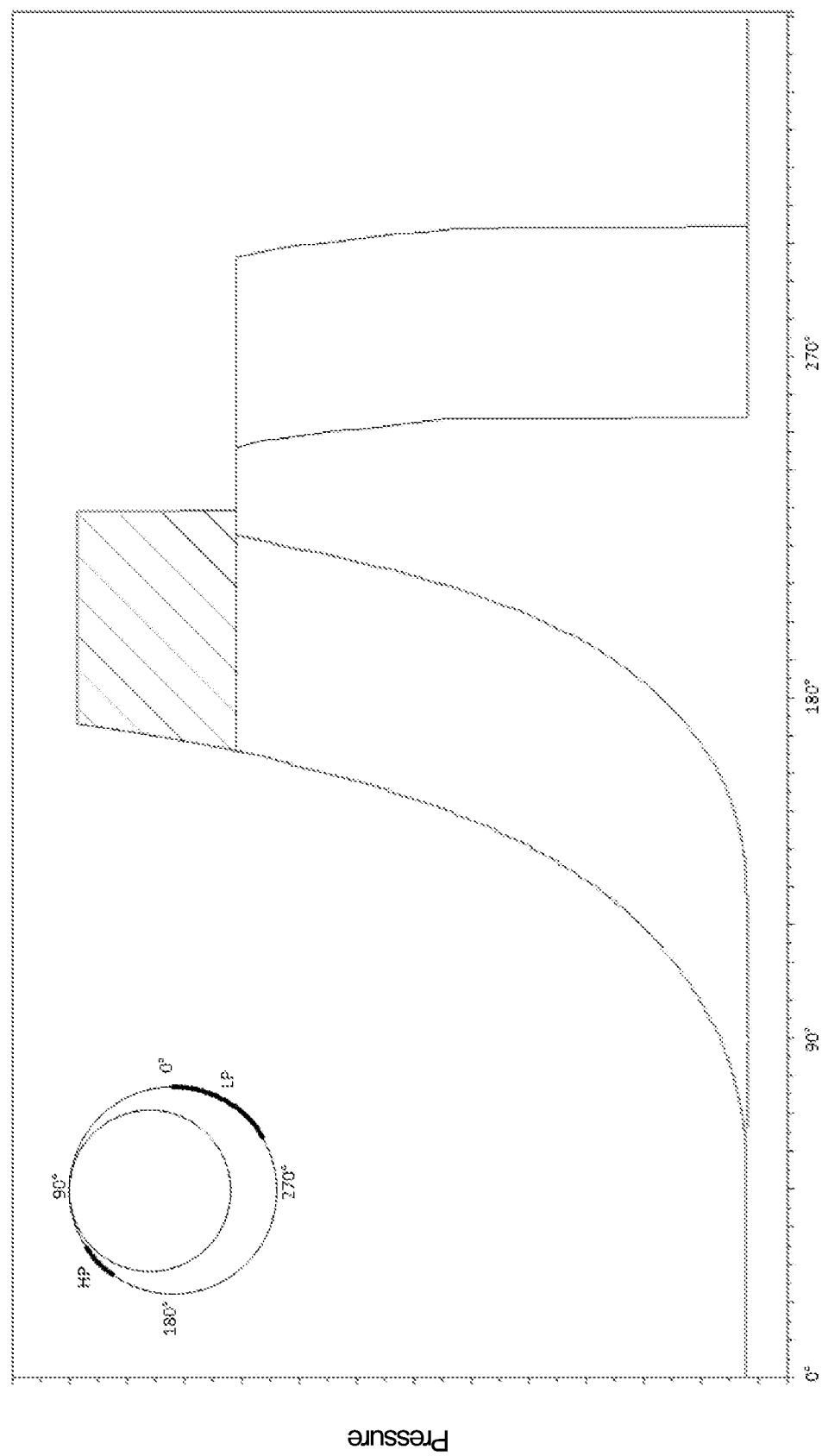
FIG. 5 shows a typical pressure distribution along the perimeter of the housing of a rotary vane compressor.

FIG. 5 shows a typical pressure distribution along the perimeter of the housing (2) of a rotary vane compressor. The x-axis shows the rotational angle (in degrees) and the y-axis shows the internal pressure of the compressor. In the upper left-hand section of FIG. 5 a simplified view is depicted, the compressor rotor eccentrically placed within the compressor housing, with high pressure (HP) discharge and low pressure (LP) inlet. At any point along the perimeter, the pressure may vary between the minimum pressure graph and the maximum pressure graph, depending on the rotor position. The process pressure that acts on the primary sealing arrangement varies both with angular position and over time. In reality, the pressure transients will in general be more "lenient" than what the calculations show. Nonetheless, it is shown very large pressure fluctuations where the pressure changes between min to max may occur in 40-400 microseconds. In a rotary vane compressor, the inlet area for the process fluid is typically a third of the perimeter. In this area, the fluid pressure is generally low and constant, close to the inlet pressure. The process fluid is compressed during about a third of the revolution, and in this area, the fluid pressure may vary between the lowest and the highest fluid pressure in the compressor, according to the vanes' positions. As can be seen from FIG. 5, the pressure variation is not necessarily the same in all positions. Near the exit (here: discharge), the fluid pressure is always high, though in some cases, the pressure may even be higher than the exit pressure, due to operating conditions, in a smaller area, part of the time. This leads to several challenges for a sealing solution:

The seal will experience low fluid pressure in some areas and high fluid pressure in other areas while large portions of the seal being exposed towards a variable (at a high frequency) oscillating fluid pressure.

Stringent requirements are placed upon a seal that shall function at different conditions and be able to tolerate transients.

Mechanical seals require a large contact force to seal against high pressures, but will degrade at a fast rate if they are exposed to a high contact force at low pressures.

FIG. 6 is a detailed view of the cross section through the seal arrangement (3), showing the sealing assembly (3) placed in the housing (2), and sealing bearing ring (4) facing the plane sealing surface (1a) of the rotor (1). This embodiment is the same configuration as FIG. 3 in components, but the assembly is a mirrored version of FIG. 3. The seal assembly could be held axially in place by means of an annular and coaxial plate (not shown) that is threaded or bolted into the outer portion of the compressor housing (2). Said plate could be sealed against the housing (2) and or water distance ring (8) by means of an O-ring, gasket or similar sealing means.

In an embodiment, the piston arrangement is an annular piston ring (5). By utilizing a separate annular piston ring, said ring may be machined as a separate annular part.

In one, not shown embodiment, the piston arrangement comprises a plurality of pistons. Using a plurality of pistons increases the functionality and repeatability of regulating and controlling a correct and uniform pressure on the sealing bearing ring (4). There is lower probability of the pistons getting pinched or stuck during operation when compared to a solid annular ring solution.

In yet another embodiment, a water distance ring (8) is arranged between the piston housing ring (6) and housing (2), where the water distance ring (8) has one or more lubrication fluid conduits (8a). Accordingly, a water distance ring (8) can be separately fabricated from a circular plate that is simple to machine and O-ring grooves are simple to form in this configuration. This water distance ring (8) is shown in FIGS. 3 and 6. Sealing between the water distance ring (8), housing (2) and piston housing ring (6) can be performed using O-rings or similar sealing units.

In an embodiment, a retaining and guide ring (7) has a guide ring surface (7a), where the retaining and guide ring (7) is facing towards the piston housing ring (6). The retaining and guide ring (7) is arranged onto the piston housing ring (6) in an outer circumferential portion of the bearing ring (6).

In another, related embodiment, the retaining and guide ring (7) is facing towards the piston housing ring (6), the retaining and guide ring (7) is arranged onto the piston housing ring (6) in an outer circumferential portion of the housing ring (6) and coaxially arranged onto an outer circumference of the sealing bearing ring (4).

In a further embodiment, the sealing bearing ring (4) has a shoulder (4s; shown in FIG. 3) protruding in an outward radial direction to interact with a corresponding inward directed protruding shoulder (7s; also shown in FIG. 3) on the guiding and fixation ring (7). Further, the housing ring (6) has a recess in a radial direction for restraining the retaining and guide ring (7). By virtue of this arrangement, securing and guiding of the sealing bearing ring (4) in both radial and axial directions is possible. This configuration is shown in FIG. 3.

In another embodiment, there are provided fastening means arranged in the retaining and guide ring (7) for securing of the piston housing (6) and securing and guiding the sealing ring (4). This configuration is shown in FIG. 3. The fastening means may comprise of standard threaded through-bolts (B) where the through-bolts (B) are fixed and threaded into the housing (2). Still with reference to FIG. 3, the water distance ring (8), piston housing ring (6) and retaining and guide ring (7) have through-holes that are coaxial and correspond and line up with the through-bolts (B). A second type of fastening means for fixation may be by way of threads, where the threads are formed on an outer circumferential surface of the retaining and guide ring (7) that mesh and engage with threads that are formed on an inner circumferential surface of the housing (2). The threads on the housing (2) and the sealing bearing ring (4) are coaxial with the axis (1c). The threads are not shown in FIG. 3 but a person skilled in the art may fully understand the concept of threaded connections. By using through-bolts (B) or threads, it is achieved ease and simplicity with respect to holding the retaining and guide ring (7) in place.

In another embodiment, the flow restriction of the bearing fluid channel is at least in part provided by discrete/distinct flow restrictions. This is depicted in FIG. 3. These flow restrictions may be formed by a restrictor (5a) that is placed in the bearing piston fluid channels (5b). By using flow restrictors, it is possible to avoid supplying too much lubrication fluid to the sealing arrangement. Using predefined flow-analysis and calculations, it is possible to predict the necessary amount of fluid that is required to obtain a correct flow rate.

Turning again to FIG. 3, the disclosure is also a sealing method for a sliding vane machine for sealing between a rotating plane surface (1a) on a rotor (1) and a machine housing (2) to prevent flow of process fluid between an internal volume (10) to an external volume (13) of said vane machine, said housing (2) comprising a seal pocket (P) located at a housing end and said seal pocket (P) opens towards the direction of the external volume (13) and the internal volume (10), comprising the following;

mounting a sealing assembly (3) in said seal pocket (P), by arranging sealing bearing ring (4) between a piston arrangement (5, 5') and said plane surface (1b), supplying a fluid through a supply line (12) for a pressurized lubrication fluid through said housing (2) to a piston cavity (6c), and to piston fluid channels (5b) in said piston arrangement (5, 5')

and further to lubrication conduits (4d) through said bearing seal ring (4), corresponding with said piston fluid channels (5b), restricting, at least in part by means of flow restrictors (5a), fluid flow through the fluid channels (5b), pressurizing said lubrication fluid thus moving or forcing said piston (5, 5') towards and against said sealing bearing ring (4) and thus moving or forcing said sealing bearing ring (4) towards and against said sealing surface (1a) and thus sealing between said rotating plane surface (1a) on said rotor (1) and said machine housing (2).

I claim:

1. A sealing arrangement of a sliding vane machine used as a compressor, expander or pump, for sealing between a rotating plane surface on a rotor and a machine housing to prevent flow of process fluid between an internal volume to an external volume of said sliding vane machine, wherein:

said machine housing comprising a seal pocket located at a housing end and said seal pocket opens towards the direction of said external volume and said internal volume, a sealing assembly arranged for mounting in said seal pocket, wherein said sealing assembly further comprising:

a piston arrangement, and a sealing bearing ring between said piston arrangement and said rotating plane surface;

a fluid supply line for a pressurized lubrication fluid through said machine housing to a piston cavity, said piston arrangement further having piston fluid channels and said sealing bearing ring having lubrication conduits through said sealing bearing ring corresponding with said piston fluid channels, said pressurized lubrication fluid arranged for moving and forcing said piston arrangement against said sealing bearing ring and thus moving and forcing said sealing bearing ring against said rotating plane surface wherein flow restriction of said piston fluid channels at least in part is provided by flow restrictors.

2. The sealing arrangement according to claim 1, wherein said piston arrangement is accommodated in one or more corresponding said piston cavities, said one or more piston cavities being arranged in an inner portion of said seal pocket.

3. The sealing arrangement according to claim 2, wherein said piston cavities are arranged in a wall in said seal pocket in said machine housing.

4. The sealing arrangement according to claim 1 further comprising a piston housing ring arranged between said sealing bearing ring and machine housing and accommodating one or more of said piston cavities for said piston arrangement, wherein said piston housing ring further comprises channels through said one or more piston cavities.

5. The sealing arrangement according to claim 4, further comprising a water distance ring arranged between said piston housing ring and said machine housing.

6. The sealing arrangement according to claim 4, further comprising a retaining and guide ring with a guide ring surface, wherein said retaining and guide ring is facing towards said piston housing ring and said retaining and guide ring is arranged onto said piston housing ring in an outer circumferential portion of said sealing bearing ring.

7. The sealing arrangement according to claim 6, wherein said retaining and guide ring is facing towards said piston housing ring, said retaining and guide ring is arranged onto said piston housing ring in an outer circumferential portion of said piston housing ring and coaxially arranged onto an outer circumference of said sealing bearing ring.

8. The sealing arrangement according to claim 6, further comprising a guiding and fixation arrangement wherein said sealing bearing ring has a shoulder protruding in an outward radial direction to interact with a corresponding inward directed protruding shoulder on said retaining and guide ring, and further said piston housing ring has a recess in a radial direction for restraining said retaining and guide ring.

9. The sealing arrangement according to claim 1, wherein said piston arrangement is an annular piston ring.

10. The sealing arrangement according to claim 1, wherein said piston arrangement is a plurality of pistons.

11. The sealing arrangement according to claim 10, wherein said flow restrictor is placed in said piston fluid channels in said plurality of pistons to limit the fluid flow to the corresponding lubrication conduits.

12. A sealing method of a sliding vane machine used as a compressor, expander or pump for sealing between a rotating plane surface on a rotor of said sliding vane machine and a machine housing to prevent flow of process fluid between an internal volume to an external volume of said sliding vane machine, said machine housing comprising a seal pocket located at a housing end and said seal pocket opens towards the direction of the external volume and the internal volume, the sealing method comprising:

mounting a sealing assembly in said seal pocket, by arranging sealing bearing ring between a piston arrangement and said rotating plane surface, supplying a fluid through a supply line for a pressurized lubrication fluid through said machine housing to a piston cavity, and to piston fluid channels in said piston arrangement and further to lubrication conduits through said sealing bearing ring corresponding with said piston fluid channels, at least partially restricting, by means of flow restrictors, fluid flow through the piston fluid channels, pressurizing said lubrication fluid, thus forcing said piston arrangement against said sealing bearing ring and thus forcing said sealing bearing ring against said rotating plane surface and thus sealing between said rotating plane surface on said rotor and said machine housing.

\* \* \* \* \*